Patented July 21, 1942

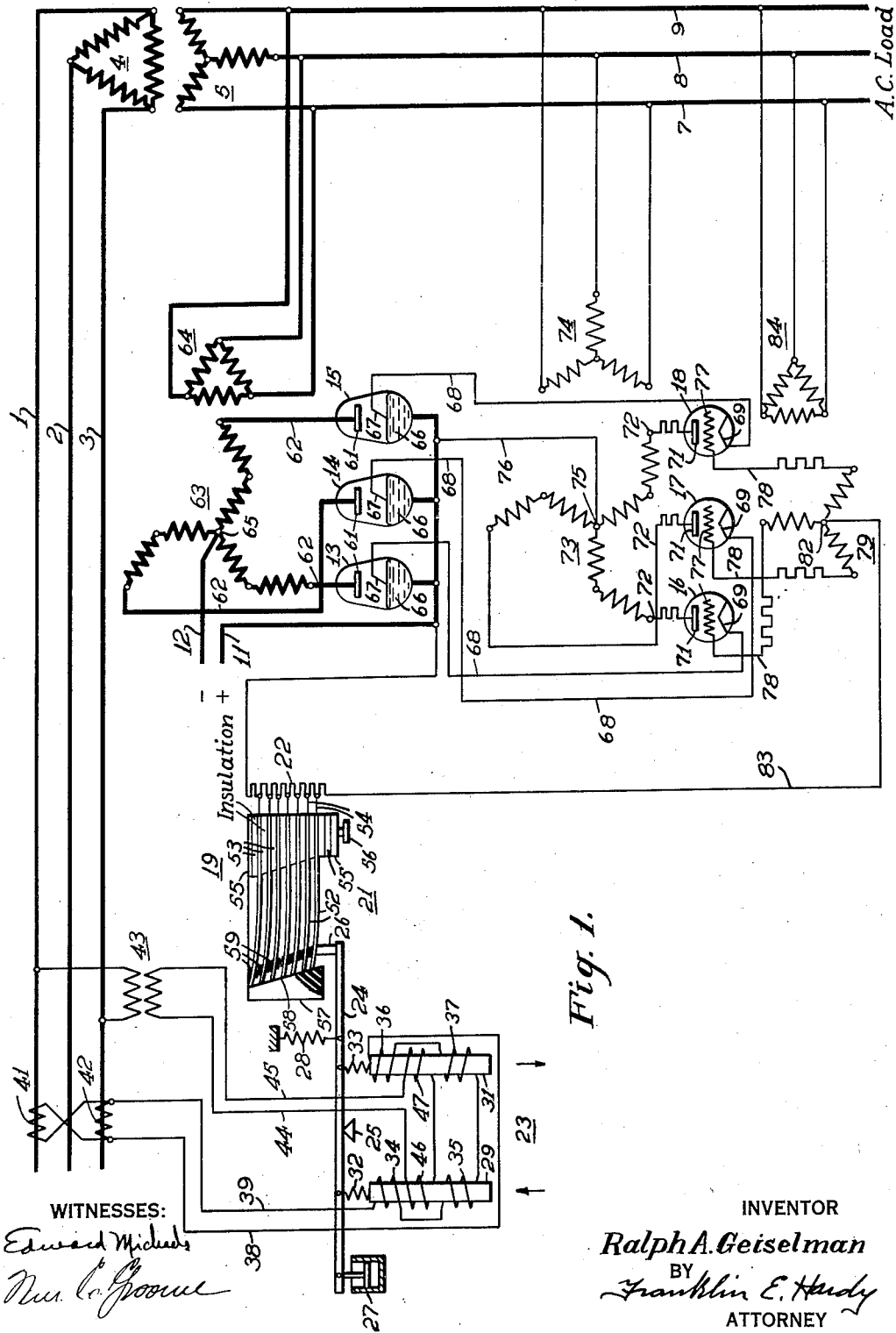

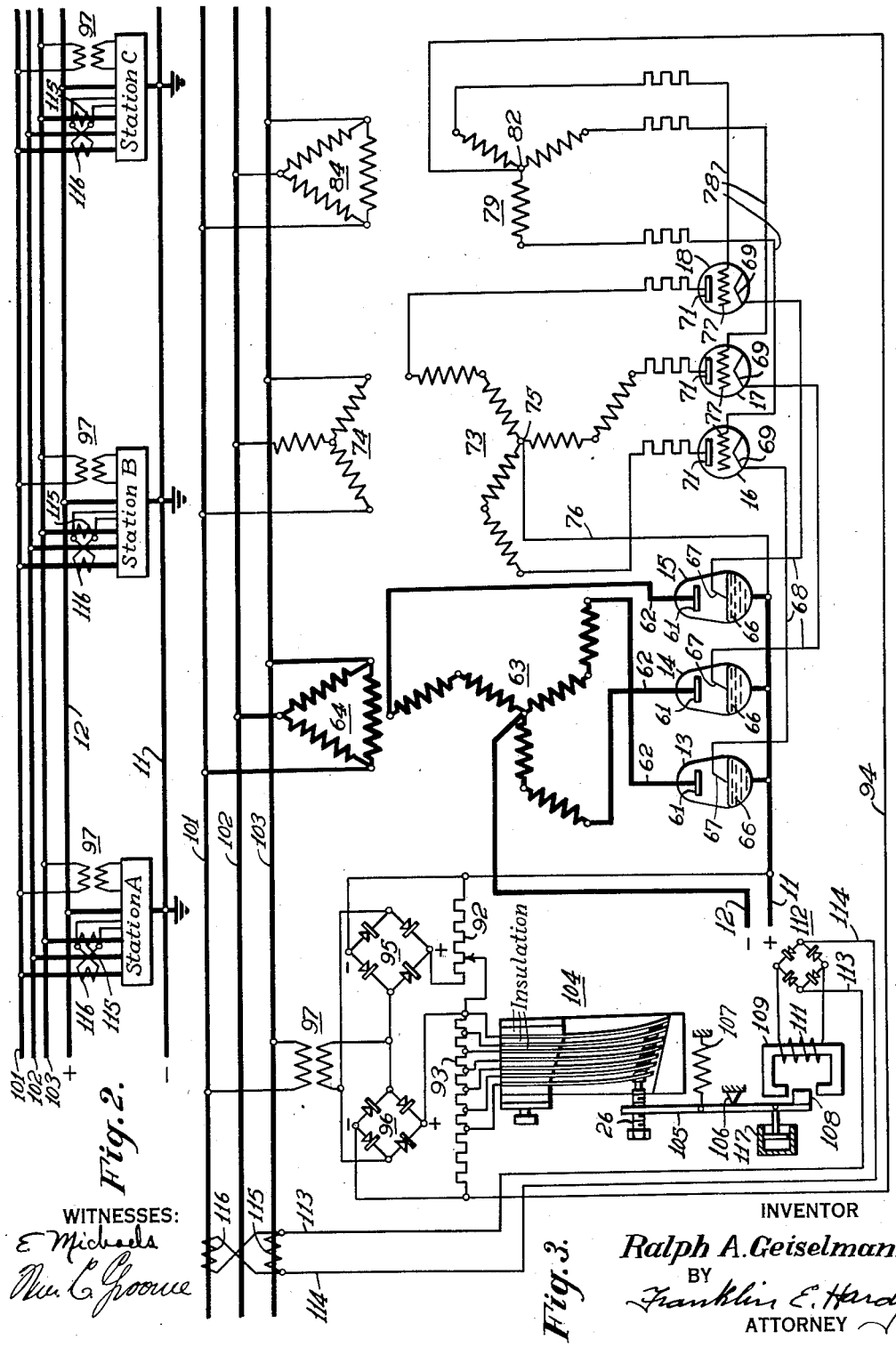

2,290,682

UNITED STATES PATENT OFFICE 2,290,682

REGULATING SYSTEM

Ralph A. Geiselman, Wilkinsburg, Pa., assignor to Westinghouse Electric & Manufacturing Company, East Pittsburgh, Pa., a corporation of Pennsylvania Application July 12, 1940, Serial No. 345,061

4 Claims. (Cl. 175—363)

My invention relates to regulating apparatus for controlling the application of unidirectional energy from an alternating current source that is suitable for a number of industrial applications, such, for example, as regulating the current supplied from a plurality of stations to a load circuit, or the load in watts taken by the system or plant of a customer from an alternating current power supply.

One application of the invention relates to load regulating systems for controlling the load or purchased electric power consumed by a customer. Due to the economies of electric power generation and transmission, power companies are desirous of maintaining a continuous constant load on their system and to avoid, so far as possible, high peak loads of short duration, since the available equipment must always be sufficient to maintain the load at the peak value required, and, if this is used only for a short period of time throughout the twenty-four hour period, the equipment remains idle without advantage to the company. Consequently, many industrial plants which purchase electric power are required to pay at a higher rate if the total power consumed exceeds a predetermined agreed upon value, as measured either by watt meters or demand meters recording the power consumed.

Certain industries carry loads of a character which make it economical to automatically vary the load on certain apparatus as the load on other apparatus varies in order to maintain the power consumed at a substantially constant value within the limits in which the lower power rates are available to the customer.

Many plants in the electrochemical industry, for example, lend themselves to automatic plant load regulation, since these plants consist of a heavy base load of electrolytic cells and a small varying plant load comprised of motors, lights, etc.

The electrolytic cell load may readily be varied without appreciable inconvenience to the satisfactory operation of the equipment and thus equalize the demand. The load supplied to the cells is regulated to fill in the valleys and smooth out the peaks of the power consumption curve. Regulating systems available for regulating such plant loads have not come into as extensive use as might be because the existing systems do not have the sensitivity and access desired in order that the benefits of automatic regulation be fully realized.

The load should preferably be regulated automatically at some predetermined value, such as the kilowatt value, which when exceeded for an appreciable time, would result in a penalty to the power purchaser. If a regulator system can maintain this kilowatt load with greater access, the penalty is avoided and at the same time, the maximum kilowatt input is obtained for the electrochemical load.

The electrochemical load should preferably be supplied through an Ignitron rectifier unit since this type of equipment possesses several advantages. The response of the output voltage to the adjustment of the regulator is substantially instantaneous, and the control power required for the operation of the regulating equipment is very small.

In view of the advantages pointed out above a regulating system of the above-indicated character may be operated with the primary control element of the system set closer to the permitted maximum load available to the consumer than would otherwise be possible, because a smaller margin is required between this maximum load and the permitted power consumable at the lower rate.

Another application of the invention is for regulating alternating current energy supplied to a rectifier station which may be one of a plurality of such stations for supplying unidirectional current to the load circuit at spaced points.

It is an object of the invention to provide for regulating the output of unidirectional energy from igniter controlled mercury cathode rectifier units to control an electrical characteristic of a circuit, such as the voltage, current, or watts.

It is a further object of the invention to provide a regulator system of the above-indicated character in which the igniter controlled mercury cathode rectifier units are controlled by operation of an electroresponsively controlled variable impedance device in which a series of flexible, self-biasing contact members are adjustably positioned against a stop in spaced relation and are permitted unrestricted movement away from the stop into engagement with adjacent contact members of the series for controlling the value of the variable impedance.

Other objects and advantages of the invention will appear from the following description of certain preferred embodiments of the invention, in which:

Figure 1 is a diagrammatic view of circuits and apparatus illustrating a preferred embodiment of the invention as applied to a plant load regulating system;

Fig. 2 is a diagrammatic view illustrating a plurality of rectifier stations spaced along a load circuit for supplying unidirectional current to the circuit from an alternating current source at a number of spaced points; and Fig. 3 is a diagrammatic view illustrating the circuits and apparatus employed in one of such stations.

Referring to Fig. 1 of the drawings, an alternating current power circuit is illustrated comprising conductors 1, 2 and 3 for supplying current to a plant transformer having primary windings 4 and secondary windings 5 for supplying energy to the plant load indicated generally as an alternating current load connected to conductors 7, 8 and 9 and a direct current load supplied through conductors 11 and 12 from Ignitron rectifier units 13, 14 and 15 as controlled by igniter tubes 16, 17 and 18, respectively.

The alternating current load supplied from conductors 7, 8 and 9 may be of a character that is not readily controllable and may consist, for example, of certain motor and lighting loads that are required to be employed as the necessity of the operations of the plant dictates. This load may vary well within the total power desired from the alternating current source, which power may be maintained substantially constant by regulating the power supplied to the direct current load of the plant through conductors 11 and 12. For the purpose of regulating the power supplied through alternating current circuit conductors 1, 2 and 3, a primary regulating device is provided, indicated generally by the numeral 19 comprising a leaf spring assembly 21 for controlling the value of a variable resistor 22 and electroresponsive means indicated generally at 23 for controlling the operation of the leaf spring assembly.

The electroresponsive mechanism 23 comprises a movable arm 24 pivotally mounted at 25 and carrying a driving member 26 at one end for operating the leaf spring assembly and at the other end the dashpot 27 for stabilizing the movement of the arm 24. The arm 24 is actuated by the joint force of a spring 28 connected to effect a counterclockwise movement of the arm 24 and by two electromagnets having cores 29 and 31, respectively, and connected to the arm 24 by means of springs 32 and 33, respectively, at opposite sides of the pivot 25 to effect a clockwise movement of the arm 24 against the pole of the spring 28, as indicated by the direction of the arrows shown below the core elements 29 and 31. The cores 29 and 31 are energized jointly from two circuits, one circuit including current coils 34 and 35 that are differentially related and positioned adjacent opposite ends of the core 29 and coils 36 and 37 that are also differentially related and positioned adjacent opposite ends of the core 31, the four coils 34, 35, 36 and 37 being connected in a circuit by conductors 38 and 39 to be energized from current transformers 41 and 42 connected as shown and associated with supply circuit conductors 1 and 3. A second circuit is provided that is supplied from a voltage transformer 43 shown connected between supply conductors 1 and 3 and including conductors 44 and 45 and windings 46 and 47, the winding 46 being about the core 29 and positioned between the differentially wound windings 34 and 35, and the winding 47 being about the core 31 between the differentially related windings 36 and 37. The device 23 operates in a well known manner to create a torque on the arm 24 in a clockwise direction that is a measure of the watts or power flowing in the circuit represented by conductors 1, 2 and 3.

The leaf spring assembly 21 that is actuated by the watt responsive element 23 may correspond to the construction disclosed in the copending application of C. R. Hanna et al., Serial No. 203,876, filed April 23, 1938, for Regulator, and assigned to the same assignee as this application.

The leaf spring assembly includes a plurality of flexible leaf spring contact members 52 that are arranged in a stack having corresponding ends thereof fixed against movement by being clamped between layers of insulating material such as fishpaper 53 which provide insulating barriers between adjacent contact members 52 that are connected by conductors 54 to spaced points along the resistor 22. The alternating layers of fishpaper 53 and the leaf spring contact members 52 are held in a clamping device shown as comprising the plates 55 on opposite sides thereof which are held in position by an adjustable pressure holding member 56. The opposite ends of the leaf spring contact members 52 are free to move and are biased into engagement with a stop 57 of insulating material for limiting their motion in a direction downwardly as shown in the drawings and for spacing the free ends of the spring contact members 52 out of contact closing engagement with one another, except when moved from engagement with the stop by the driving member 26 carried on the movable arm 24 and actuated in accordance with the energization of the watt responsive device 23.

The block 57 of insulating material is so positioned with respect to the free ends of the several leaf springs 52 and that are so biased by the progressively advanced edges of the several layers of fishpaper 53 that the leaf springs 52 are brought against the sloping surface 58 of the block 57 with a slight loading or biasing force due to the spring-like characteristic of the leaves and the downward bias given them by the arrangement of the stack of fishpapers 53. The several leaf springs 52 are, therefore, accurately spaced from one another at their free ends upon engagement with the block 57, regardless of a possible lack of straightness of the individual leaves. Each of the individual leaf springs 52, which may be of bronze, carries a silver button 59 adjacent the outer free end thereof through which a circuit may be completed between adjacent leaf springs when so biased as to bring the contact members, or buttons 59, carried thereby into engagement.

The employment of a sloping surface 58 on the block 57 as a stop for spacing the members 52 permits the use of a large number of spring members 52 in a small space since the required space between the adjacent leaf springs may be very small and may be accurately controlled. This arrangement permits a free unrestricted movement of the members 52 in a direction from the block 57 which does not exist where individual stops are provided between the several contact controlling members, and where such members must necessarily be essentially stiff levers capable of independent operation as such, or are self-biasing members having sufficient rigidity to space themselves, without the necessity of employing spacing stop means. The close spacing of the contact member also results in a control device having a large number of steps controlled by a slight movement only of the driving member 26. The steps are so proportioned that the energy values controlled between any two spring members 52 are kept low in magnitude, thus avoiding burning or damaging the surface of the silver contact buttons 59.

The Ignitrons 13, 14 and 15 are provided with anodes 61 that are connected by conductors 62 to the outer ends of the secondary winding 63 of a main power transformer, the primary winding 64 of which is connected to conductors 7, 8 and 9. The winding 63 is shown as of the Y-connected distributed type having a neutral point 65 connected to the negative direct current conductor 12. The Ignitrons 13, 14 and 15 are also provided with mercury pool cathodes 66 that are connected to the positive conductor of the direct current load circuit. Igniters 67 are provided and associated with the mercury pool cathodes of the three Ignitron tubes 13, 14 and 15 and are connected by conductors 68 to the cathodes 69 of igniter tubes 16, 17 and 18, respectively.

The igniter tubes 16, 17 and 18 are provided with anodes 71 that are connected by conductors 72 to the outer terminal of a Y-connected secondary distributed winding 73 of a charging transformer having a primary winding 74 connected to conductors 7, 8 and 9. The neutral point 75 of the distributed secondary winding is connected by conductor 76 to the conductor 11 of the unidirectional output circuit from the rectifiers 13, 14 and 15. The igniter tubes 16, 17 and 18 are likewise provided with control grids 77 that are connected by conductors 78 to the outer terminals of a three-phase grid transformer secondary winding 79, the neutral point 82 of which is connected by a conductor 83 to complete a circuit through the variable resistor 22 to the positive conductor 11 of the unidirectional output circuit. The grid transformer is provided with a primary winding 84 that is inductively related to the secondary winding 79 and is connected to the circuit conductors 7, 8 and 9. The grid circuit for the igniter tubes 16, 17 and 18 extends from the respective cathodes 69 by conductors 68 through igniters 67 of the respective associated Ignitron tubes to conductor 11 through resistor 22, conductor 83, the several phase windings of the grid transformer secondary 79, and conductors 78 to the respective grids 77 of the several tubes.

In the operation of the system described above and illustrated in Fig. 1, if the power supplied to the plant through conductors 1, 2 and 3 is considerably below the maximum permitted by the regulator system, the spring 28 of the watt responsive device 23 will move the arm 24 upwardly so that the driving member 26 will have engaged the nearest of the silver buttons 59 and have moved the several leaf spring conductors 52 upwardly so that a circuit is closed through the several buttons in shunt to the portions of the resistor 22 connected therebetween. As the power flowing in the circuit represented by conductors 1, 2 and 3 increases, an increasing torque will be developed on the watt responsive element 23 acting in a clockwise direction against the spring 28 to move the driving member 26 downwardly and cause an increasing number of the leaf springs 52 beginning at the top of the stack as illustrated in Fig. 1 to engage the inclined surface 58 and thus insert an increasing number of portions of the resistor 22 in the grid circuit of the tubes 16, 17 and 18. The variation in the effective value of the resistor 22 correspondingly varies the negative grid bias developed between conductors 11 and 83 to thereby control the conductivity of the igniter tubes 16, 17 and 18 and the output current of the Ignitrons 13, 14 and 15 in a direction to increase or decrease the unidirectional load current supplied to circuit conductors 11 and 12 to thus maintain a total plant load supplied to conductors 1, 2, 3, substantially constant irrespective of variations in the load drawn from conductors 7, 8 and 9 by the alternating current equipment supplied therefrom.

Referring to Figs. 2 and 3, a plurality of stations indicated as stations A, B and C are provided for converting alternating current energy into direct current energy supplied to conductors 11 and 12, each of the three stations being equipped with apparatus connected as shown in Fig. 3. This apparatus includes Ignitron tubes 13, 14 and 15 and igniter tubes 16, 17 and 18 connected to the main transformer secondary windings 63, the charging transformer secondary windings 73 and the grid transformer secondary winding 79 in the same manner as described with respect to the apparatus illustrated in Fig. 1. The grid control circuit for the tubes 16, 17 and 18 includes resistors 92 and 93, conductor 94. Dry type rectifier devices 95 and 96 are shown connected through a transformer 97 to receive alternating current energy from conductors 101 and 103 of a three-phase circuit for supplying a positive and a negative grid bias, respectively, across resistors 92 and 93 to facilitate the adjustment in the axes between the anode voltage wave and the grid voltage wave for determining the time of firing the tubes 16, 17 and 18. The effective value of the resistor 93 in the grid control circuit is controlled by a leaf spring assembly 104 which corresponds to the leaf spring assembly 21 described in Fig. 1. The magnet structure for actuating the movable arm 105 carrying the diving member 26 may correspond to that disclosed in my copending application, Serial No. 219,527, filed July 16, 1938, for Regulator, and assigned to the same assignee as this application. This structure is diagrammatically illustrated as providing a pivot 106 about which the lever arm 105 is adapted to move against the bias of a spring 107 in accordance with the force exerted on an armature 108 of magnetic material carried by the arm 105 and positioned within an air gap in a stationary core portion 109 of the magnetic circuit that is energized by winding 111 connected to receive unidirectional current from a full wave rectifier unit 112 that is supplied with alternating current through conductors 113 and 114 from current transformers 115 and 116. The energization of the regulator winding 111 is therefore a measure of the current flowing in the main alternating current supply circuits 101, 102, 103. A dashpot 117 may be provided, if found desirable to damp out overswings of the arm 105.

If the several stations shown in Fig. 2 supply unidirectional current to a railway system the regulator system of the character shown in Fig. 3 will operate to limit the current load supply by a single station to a railway system so that in the event that the load increases on the system, a share of the load will be supplied from a number of stations depending upon the load centers and the voltage drop in the supply circuit from the stations to the parts of the circuit having the heavier load.

Many modifications in the circuits and apparatus illustrated and described will be apparent to those skilled in the art, and I do not wish to be limited other than by the scope of the appended claims.

I claim as my invention:

1. In a regulating system, in combination, an alternating current circuit, electronic rectifier means for supplying unidirectional energy from said circuit to a load circuit, means for controlling the power output of said electronic rectifier means including a grid control circuit, an adjustable impedance in series in said grid control circuit, means for varying said adjustable impedance for controlling the voltage drop thereacross comprising a plurality of contact members connected to separate points along said device, stop means for spacing the contact members when engaged thereby, said stop means being arranged to permit unlimited movement of the contact members away from the stop means, means for biasing said contact members to the positions limited by the stop means, and means responsive to an electrical characteristic of said alternating current circuit for moving said contact members from engagement with the stop for varying the effective value of said impedance device.

2. In a regulating system, in combination, an alternating current circuit, electronic rectifier means for supplying unidirectional energy from said circuit to a load circuit, means for controlling the power output of said electronic rectifier means including a grid control circuit and an impedance device in series circuit therewith and means for varying the voltage drop across said impedance comprising a plurality of contact members connected to separate points on said impedance device, stop means for spacing the contact members relative to adjacent contact members, the relative movement between said contact members and said stop means being unrestricted in one direction, electroresponsively controlled means including an energizing winding for effecting the relative movement of said contact means and said stop means, and means responsive to an electrical characteristic of said alternating current circuit for operating said electroresponsively controlled means.

3. In a regulating system, in combination, an alternating current circuit, electronic rectifier means for supplying unidirectional energy from said circuit to a load circuit, means for controlling the power output of said electronic rectifier means including a grid control circuit and an impedance device in series circuit therewith and means for varying the effective value of the impedance device comprising a plurality of circuit controlling members arranged in a stack with corresponding ends supported in fixed relation and connecting to separate points along the impedance device, said fixed ends being insulated from one another, the other ends of the circuit controlling members being free to move and arranged in a stack with successively overlapping ends, a movement limiting stop having a surface against which the free ends of the circuit controlling members are biased for positioning them in spaced relation, and means responsive to an electrical characteristic of said alternating current circuit for actuating said circuit controlling members.

4. In a regulating system, in combination, an alternating current circuit, electronic rectifier means for supplying unidirectional energy from said circuit to a load circuit, means for controlling the power output of said electronic rectifier means including a grid control circuit and an impedance device in series circuit therewith and means for varying the effective value of the impedance device comprising a plurality of circuit controlling members arranged in a stack with corresponding ends supported in fixed relation and connected to separate points along the impedance device, said fixed ends being insulated from one another, the other ends of the circuit controlling members being free to move and arranged in a stack with successively overlapping ends, a movement limiting stop having a surface against which the free ends of the circuit controlling members are biased for positioning them in spaced relation, and electroresponsive means responsive to an electrical characteristic of said alternating current circuit for actuating said circuit controlling members from engagement with the stop and into engagement with the adjacent members to short-circuit selected portions of the associated impedance device.

RALPH A. GEISELMAN.